(12) United States Patent
Yoshimura et al.

(10) Patent No.: US 7,649,651 B2
(45) Date of Patent: Jan. 19, 2010

(54) PRINT DATA EDITING APPARATUS AND PRINT DATA EDITING PROGRAM STORED IN COMPUTER READABLE MEDIUM

(75) Inventors: Nako Yoshimura, Nagoya (JP); Naoki Tanjima, Nagoya (JP); Naomi Yamamoto, Nagoya (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 605 days.

(21) Appl. No.: 11/362,156

(22) Filed: Feb. 27, 2006

(65) Prior Publication Data

US 2006/0212808 A1    Sep. 21, 2006

(30) Foreign Application Priority Data

Mar. 18, 2005  (JP) .............................. 2005-079365

(51) Int. Cl.
*H04N 1/387* (2006.01)
(52) U.S. Cl. .......................... 358/1.9; 358/448; 358/452
(58) Field of Classification Search .................. 358/1.1, 358/1.9, 400, 401, 448, 452, 453, 296
See application file for complete search history.

(56) References Cited

U.S. PATENT DOCUMENTS

| 5,223,939 | A | * | 6/1993 | Imaizumi et al. | ............ 358/296 |
| 5,631,747 | A | * | 5/1997 | Farrell et al. | ................ 358/448 |
| 5,651,618 | A | * | 7/1997 | Tamiya | ........................ 400/70 |
| 7,336,912 | B2 | * | 2/2008 | Yamauchi et al. | ............. 399/82 |
| 2003/0012454 | A1 | * | 1/2003 | Manico et al. | ............. 382/282 |

FOREIGN PATENT DOCUMENTS

| EP | 1 255 400 A2 | 11/2002 |
| EP | 1 267 563 A2 | 12/2002 |
| JP | A 11-234506 | 8/1999 |

\* cited by examiner

*Primary Examiner*—Thomas D Lee
(74) *Attorney, Agent, or Firm*—Oliff & Berridge, PLC

(57) ABSTRACT

A print data editing apparatus includes a display that displays a print object in order to edit the print object; a cutoff area specifying device that specifies a cutoff area that is an area to be cut off in order to cut off a print result in which the print object that is displayed on the display is printed; and a print data creating device that creates print data to be printed with a print unit by providing cutoff line data to the print object, wherein the cutoff line data is for printing a cutoff line for cutting the cutoff area specified by the cutoff area specifying device from the print result outside a boundary of the cutoff area.

12 Claims, 15 Drawing Sheets

PRINT DATA EDITING APPARATUS AND PRINT DATA EDITING PROGRAM STORED IN COMPUTER READABLE MEDIUM

CROSS-REFERENCE TO RELATED APPLICATION

This application claims priority from Japanese Patent Application. No. 2005-079365, filed Mar. 18, 2005, the content of which is incorporated in its entirety herein by reference thereto.

BACKGROUND

The disclosure relates to a print data editing apparatus and a print data editing program stored in a storage medium.

Conventionally, in image processing software or word processor software, a creator usually edits an image of a print object on a screen and, when printing is executed, an image edited on the screen is printed out as it is. There is image processing software or word processor software having a function that prints out only a selected print object if any print object such as a character or an image is selected and instructed to be printed. However, in this case also, any print object as it is displayed on an edit screen is printed.

Recently, a hobby called "scrap booking" is popular. This scrap booking arranges photographs on a mount board in various ways along certain themes, different from a conventional arrangement of photographs that arranges photographs based only on the order of an album. In such a scrap booking, digital camera image data (and not a film photograph) may be used because the digital camera image can be processed in various ways. Further, a printed illustration, pattern, characters and other objects may be printed out from digital data and pasted on the mount board in order to place a theme of a page and journal of that theme (date, episode, description of the photograph, etc.). When an object for use in such a scrap book is printed out, the printed object is often cut out to a desired size or shape before being pasted.

Conventionally, there is provided a synthetic image print apparatus, as disclosed in Japanese Patent Application Laid-Open No. 11-234506, that prints an image (print object) by synthesizing a template containing at least any one of a cutoff line and a bend line in order to cut a print result along its intended purpose (for example, label for flexible disk, hanging tag for door knob, dice).

SUMMARY

The synthetic image printing apparatus disclosed in the aforementioned Japanese Patent Application Laid-Open No. 11-234506 has problems in that any cutoff line that is not preliminarily stored cannot be provided when synthesizing a preliminarily stored template with a print object. An optimum positional relation between a position actually desired to be cut off and a cutoff line differs depending on a desire of a cutting person. For example, someone may want to set the cutting position and the cutoff line at the same position and cut just on the cutoff line. Conversely, another person may want to cut slightly inside the cutoff line because the does not want to leave the cutoff line after the cutting. However, such a desire cannot be reflected if a preliminarily stored template is used.

The disclosure thus solves the above-described problems and achieves other advantages. One object is to provide a print data editing apparatus for creating print data in which cutoff line data is provided to a print object, such as a photograph, character, picture and pattern, and a print data editing program that is stored in a storage medium.

To achieve the above-described object, according to a first exemplary aspect, there is provided a print data editing apparatus that includes a display that displays a print object in order to edit the print object; a cutoff area specifying device that specifies a cutoff area that is an area to be cut off in order to cut off a print result in which the print object that is displayed on the display is printed; and a print data creating device that creates print data to be printed with a print unit by providing cutoff line data to the print object, wherein the cutoff line data is for printing a cutoff line for cutting the cutoff area specified by the cutoff area specifying device from the print result outside a boundary of the cutoff area.

According to a second exemplary aspect, there is provided a storage medium storing a set of program instructions executable on a data processing device and usable to edit print data for printing an object by cutting off a print result after printing with a print unit, the instructions including displaying the print object in order to edit the print object; specifying a cutoff area that is an area to be cut off in order to cut off a print result in which the print object that is displayed is printed; and creating print data to be printed with a print unit by providing cutoff line data to the print object, wherein the cutoff line data is for printing a cutoff line for cutting the cutoff area specified from the print result outside a boundary of the cutoff area.

According to a third exemplary aspect, there is provided a print data editing apparatus that includes a display that displays a print object in order to edit the print object; a print unit; and a controller that: specifies a cutoff area that is an area to be cut off in order to cut off a print result in which the print object that is displayed on the display is printed; and creates print data to be printed with the print unit by providing cutoff line data to the print object, wherein the cutoff line data is for printing a cutoff line for cutting the cutoff area specified from the print result outside a boundary of the cutoff area.

BRIEF DESCRIPTION OF THE DRAWINGS

Exemplary embodiments of the invention will be described below in detail with reference to the accompanying drawings in which.

DETAILED DESCRIPTION OF EMBODIMENTS

Figure 1:
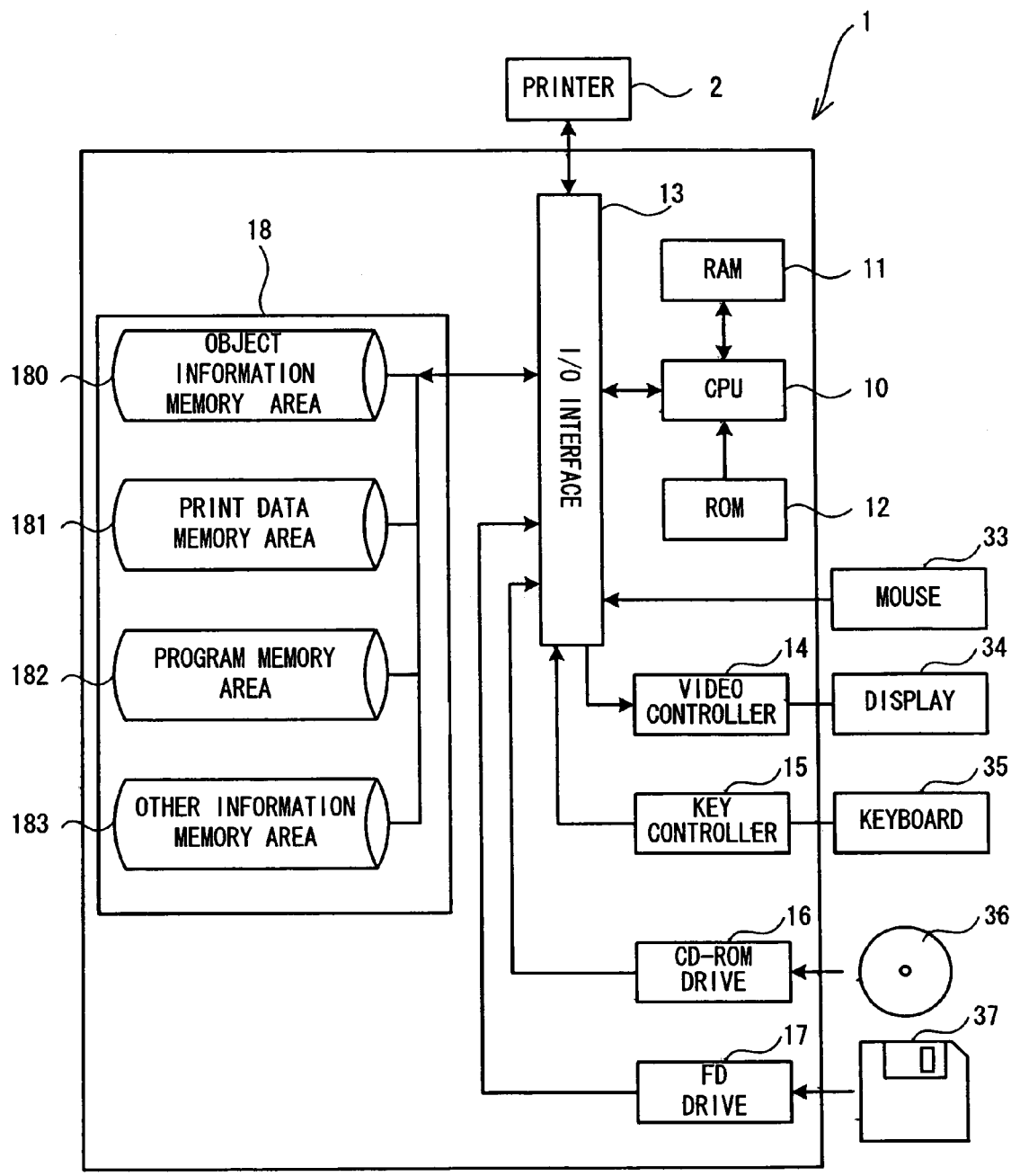
FIG. 1 is a block diagram showing the electric configuration of a print data editing apparatus loaded with the print data editing program of the present invention.

Hereinafter exemplary embodiments will be described with reference to the accompanying drawings. As shown in FIG. 1, a print data editing apparatus 1 includes a CPU 10 for controlling the print data editing apparatus 1, and a RAM 11 that temporarily stores various data, a ROM 12 that stores BIOS and the like, and an I/O interface 13 that acts as an interface for exchanging data are connected to the CPU 10. A hard disk drive 18 is connected to the I/O interface 13 and the hard disk drive 18 comprises an object information memory area 180, a print data memory area 181, a program memory area 182 and other information memory area 183.

A variety of attributes of print objects edited on an edit screen are stored in the object information memory area 180. A print data to be transmitted to a printer 2 when a print instruction is given is stored in the print data memory area 181. A print data editing program to be executed in the CPU 10 is stored in the program memory area 182. Other information for use in the print data editing apparatus 1 is stored in the other information memory area 183.

Further, a mouse 33, a video controller 14, a key controller 15, a CD-ROM drive 16 and a FD drive 17 are connected to the I/O interface 13 and a display 34 is connected to the video controller 14 and a keyboard 35 is connected to the key controller 15. A print data editing program is stored in a CD-ROM 36 to be inserted into the CD-ROM drive 16 and when it is introduced, the print data editing program is set up from the CD-ROM 36 to the hard disk drive 18 and stored in the program memory area 182. The FD drive 17 is capable of reading/writing to a flexible disk (hereinafter referred to as FD) 37. Further, the printer 2 is connected to the I/O interface 13, so that print data created by the print data editing program of the present invention can be printed.

In the meantime, the print data editing program may be introduced to the print data editing apparatus 1 not only from the CD-ROM 36 but from the FD 37. Further, it is permissible to connect a drive for reading other storage medium (such as DVD) and introduce the print data editing program from such a storage medium. Further, the print data editing program may be introduced from another computer through a network by connecting the print data editing apparatus 1 to a LAN or Internet. Although the printer 2 is connected directly to the print data editing apparatus 1 in FIG. 1, it is needless to say that a printer connected through a network may be used. The printer 2 may be a type that prints a continuous paper or a type that prints individual cut papers and a printing object is not limited to any paper but may be a seal or tape.

Figure 2:
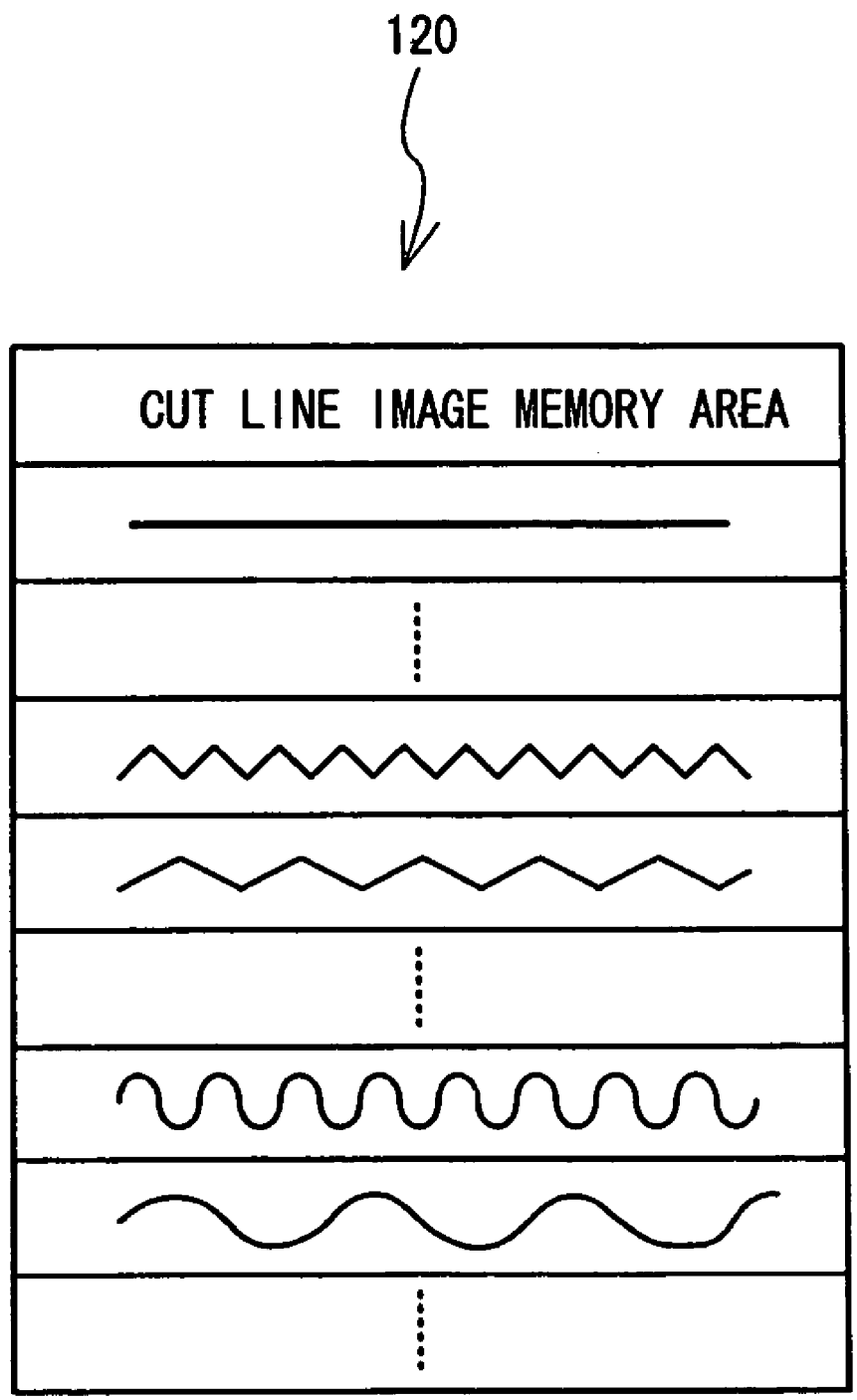
FIG. 2 is a schematic diagram of a cutoff line image memory area stored in the ROM.

Next, the cut line image memory area 120 stored in the ROM 12 will be described with reference to FIG. 2. Image data about a variety of shapes of cut lines, which are boundaries for a cutoff area, are stored in the cut line image memory area 120. Shapes of the cut lines are prepared meeting a cut edge of scissors ordinarily marketed. For example, a linear shape of the cut edge of ordinary scissors, a mountain-like shape, and wave-like shape of the cut edge of pinking scissors are available. The mountain-like and wave-like scissors include a variety of shapes depending on their angle. Further, the mountain-like and wave-like scissors include various pitch types, for example, 3 mm, 5 mm and the like corresponding to the shape of the cut edge of the pinking scissors. The example of FIG. 2 indicates the linear type, mountain-like type (narrow pitch and wide pitch), wave-like type (narrow pitch and wide pitch) and the like while other shapes are omitted (although various other shapes could have been used). According to this embodiment, an image of the cut line for use in print data is created from an image of the cut line stored in the cut line image memory area 120 by adjusting it to a line thickness specified on a cutoff line setting screen 400 described below. Speaking in detail, the line thickness is increased by adding dots adjoining a dot which forms a cutoff line to the dot which forms the cutoff line. The thickness of the line is determined depending on how many dots of adjoining dots are to be added as the dots that form the line.

Figure 3:
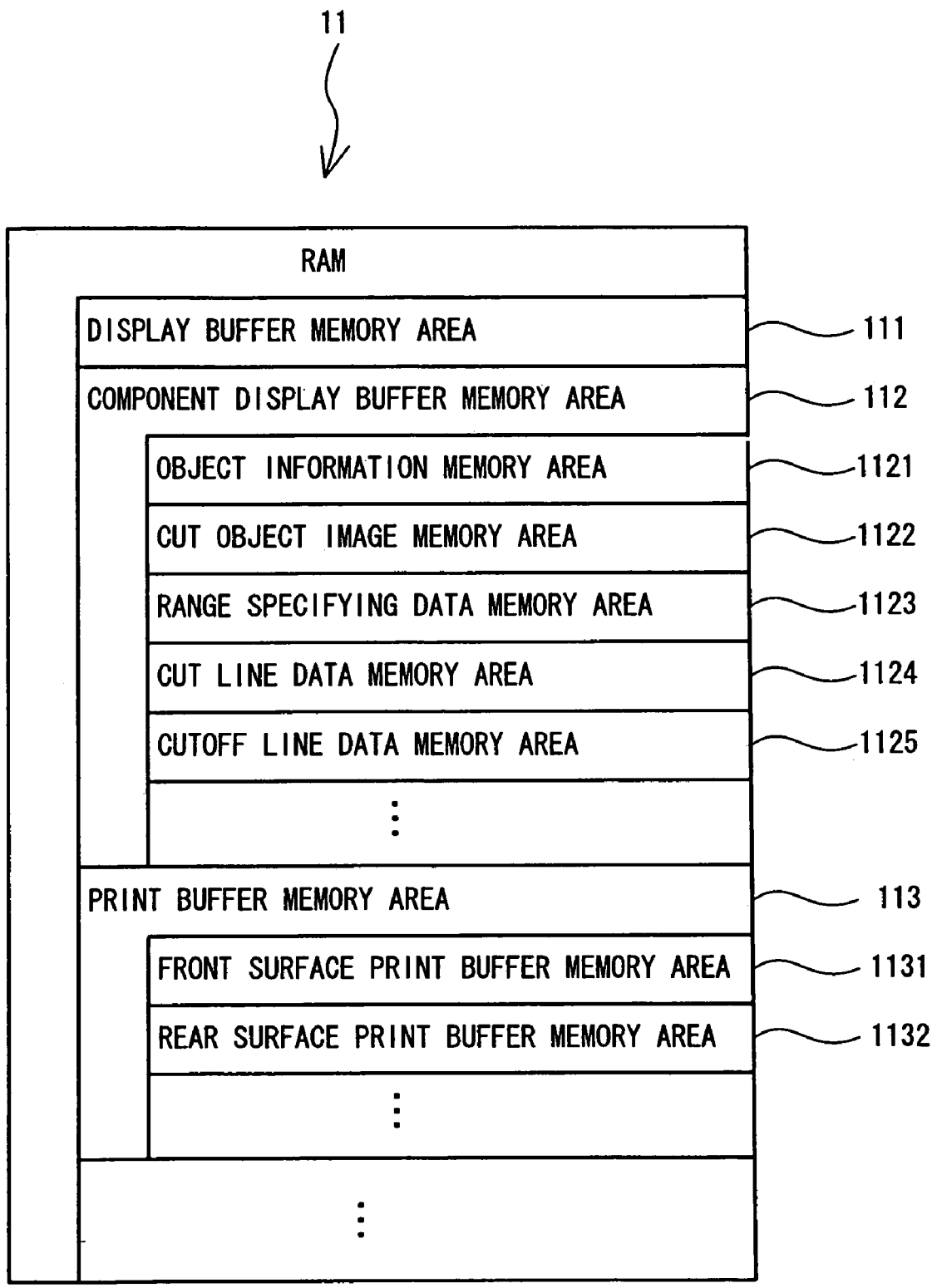
FIG. 3 is a schematic diagram of a memory area in the RAM.

Next, the memory area of the RAM 11 will be described with reference to FIG. 3. The RAM 11 includes display buffer memory area 111, component display buffer memory area 112, print buffer memory area 113 and the like. A scrap book image 101 (see FIG. 4) that is displayed in a work area 103 of an edit screen 100 described below is stored in the display buffer memory area 111. The component display buffer memory area 112 includes object information memory area 1121, cut object image memory area 1122, range specifying data memory area 1123, cut line data memory area 1124, cutoff line data memory area 1125 and the like and data of individual components constituting the scrap book image 101 displayed in the work area 103 of the edit screen 100 is stored therein.

Information about a print object displayed in the work area 103 of the edit screen 100, for example, the kind of object, position information, and graphic image is stored in the object information memory area 1121 for each print object. Further, for a print object for which a cutoff instruction is made, image data after the cutoff is stored in the cut object image memory area 1122 for each print object. For a print object for which the cutoff instruction is made, coordinates of the vertex of a graphic form indicating a cutoff range are stored in the range specifying data memory data 1123 for each print object. In the cut line data memory area 1124, image data of cut line that is to be a boundary line of the cutoff area is stored for each print object. Each side of a graphic form indicating the cutoff range is replaced with an image of this cut line cut to a predetermined length. Various data about a cutoff line to be added to print data are stored in the cutoff line data memory area 1125 for each print object.

The print buffer memory area 113 includes front surface print buffer memory area 1131, rear surface print buffer memory area 1132 and the like and print data to be sent to the printer 2 are created for the front surface and rear surface separately and stored. In the meantime, other memory areas are omitted.

Next, the edit screen 100 for editing a print object that is displayed on the print data editing program and to be pasted on a scrap book by imaging a completion of the scrap book will be described with reference to FIG. 4.

Figure 4:
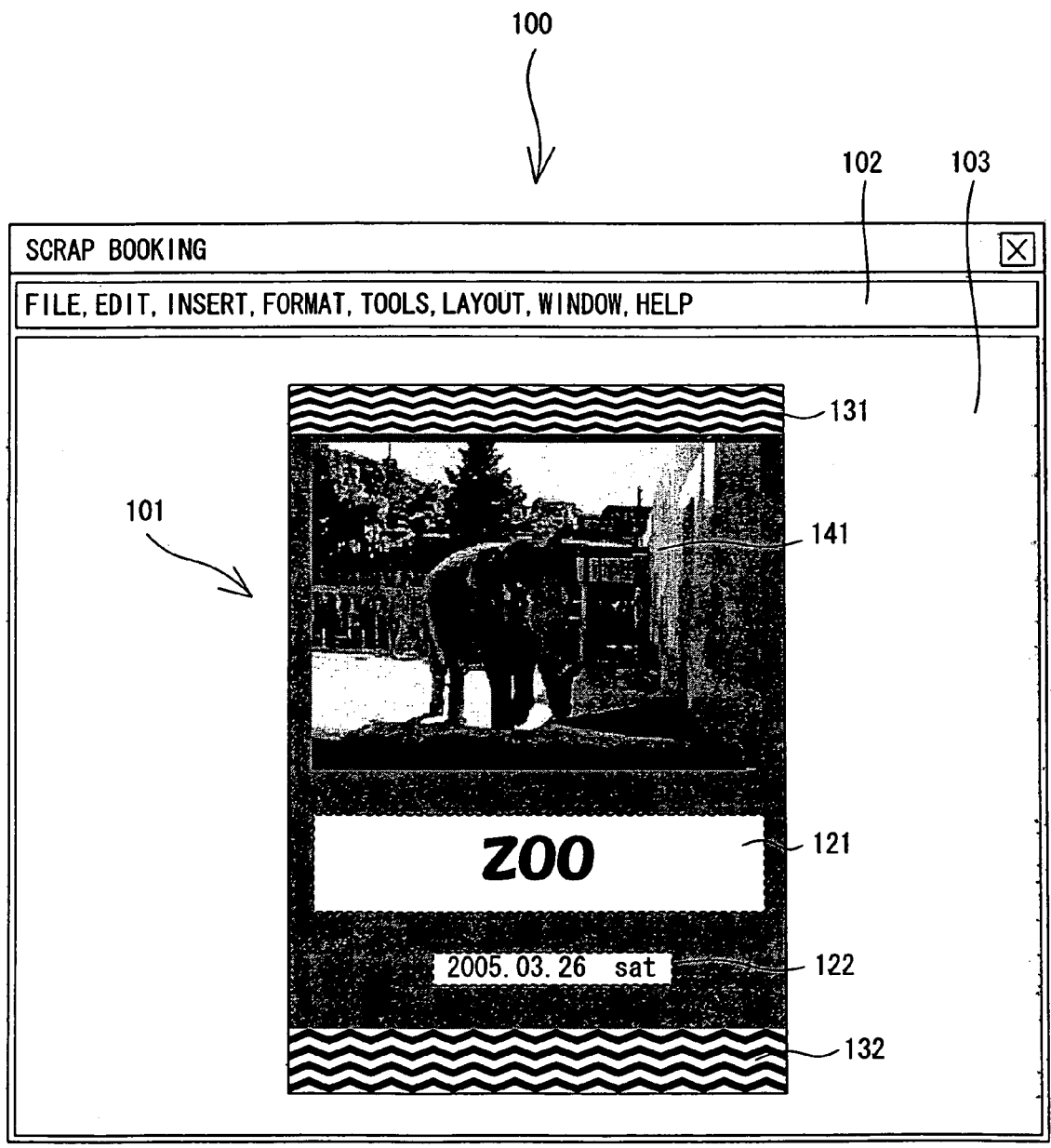
FIG. 4 is an image of an edit screen.

As shown in FIG. 4, a tool bar 102 for operation instructions for "File", "Edit", "Insertion", "Format", "Tools", "Layout", "Window", and "Help" are displayed on the top of the edit screen 100 and a scrap book image 101 that is an image of a completed scrap book is displayed in the work area 103 that occupies most of the edit screen 100. A variety of instructions are provided to the print data editing program by operating each menu on the tool bar 102 with the mouse 33 or the keyboard 35. Here, the kinds of print objects handled in this embodiment will be described with reference to the scrap book image 101. Three kinds of the print objects "photograph", "character" and "illustration" are explained in this embodiment.

The "photograph" is a print object based on photographic image data taken with a digital camera or the like. For example, a screen for selecting an image file for a photograph to be inserted (not shown) is displayed by selecting "photograph" from a list box displayed by selecting the "insertion" menu of the tool bar 102. Then, the photograph object is displayed in the work area 103 by specifying an image file of a photograph to be inserted. In an example shown in FIG. 4, a photograph object 141 of an elephant is created (in the center of the top of the scrap book image 101).

The "character" is character data inputted into the work area 103. For example, the character object is displayed by selecting "character" from a list box displayed by selecting the "insertion" menu of the tool bar 102 and characters are inputted to that character object. In the meantime, this character object allows character size, font type, and arrangement of characters within the character object to be specified. Further, it allows setting of character modifications such as character color, underline, outline character, italic character, and bold letter. In the example shown in FIG. 4, "ZOO" is entered into the character object 121 and "2005. 03. 26 sat" is entered into the character object 122.

The "illustration" is an illustration object based on image data such as a picture and a pattern created with image editing software or picked up by a scanner, not including photographic image data. For example, a screen for selecting an image file for an illustration to be inserted (not shown) is displayed by selecting "illustration" from a list box displayed by selecting "insertion" from the tool bar 102. Then, an illustration object is displayed on the work area 103 by specifying an image file of an illustration to be inserted. In the example shown in FIG. 4, wave-like illustration object 131 displayed on the top edge of the scrap book image 101 and wave-like illustration object 132 displayed on the bottom edge of the scrap book image 101 are created.

Figure 5:
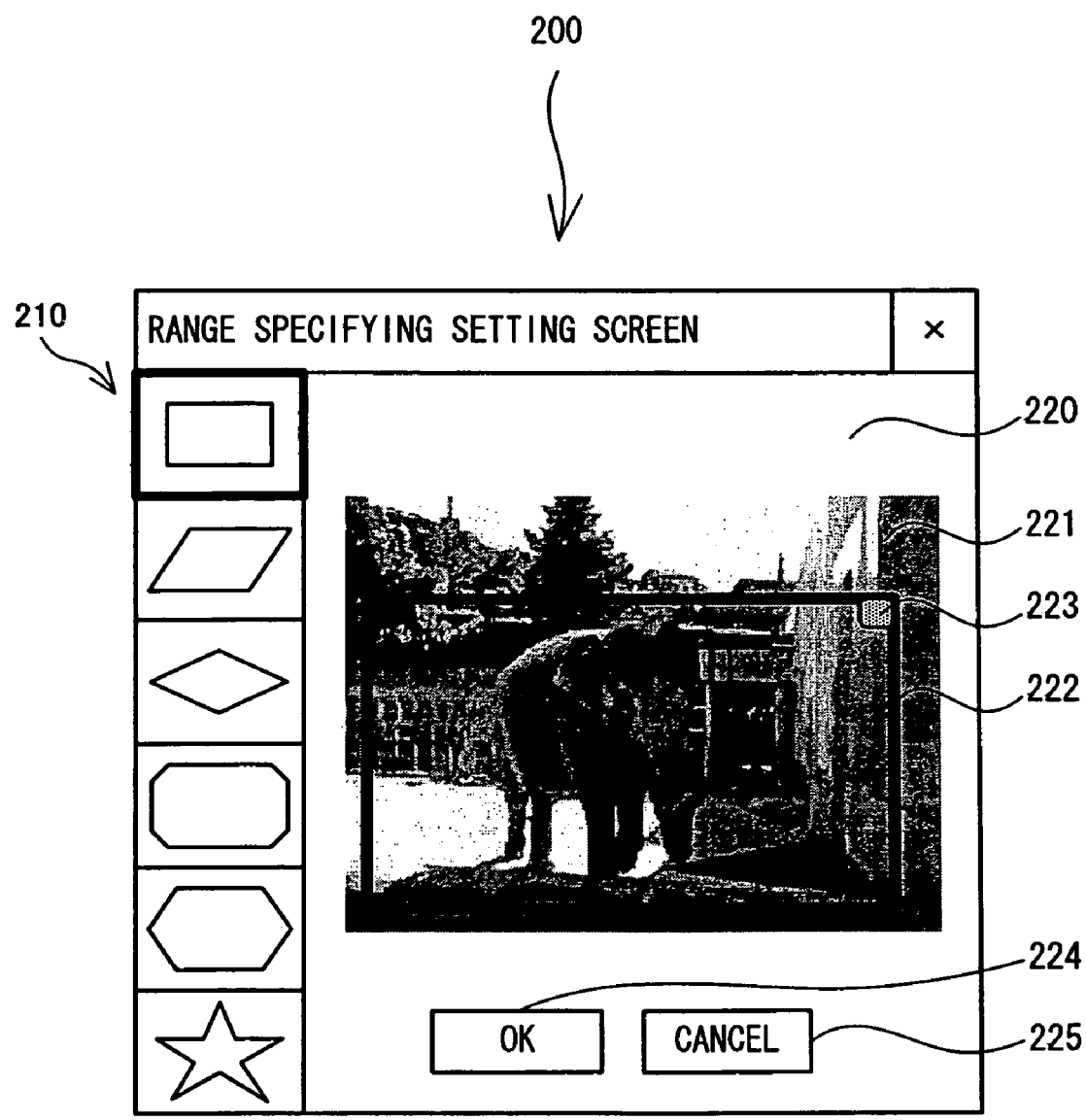
FIG. 5 is a diagram of a range specifying screen for specifying the shape and range of a cutoff area.
Figure 6:
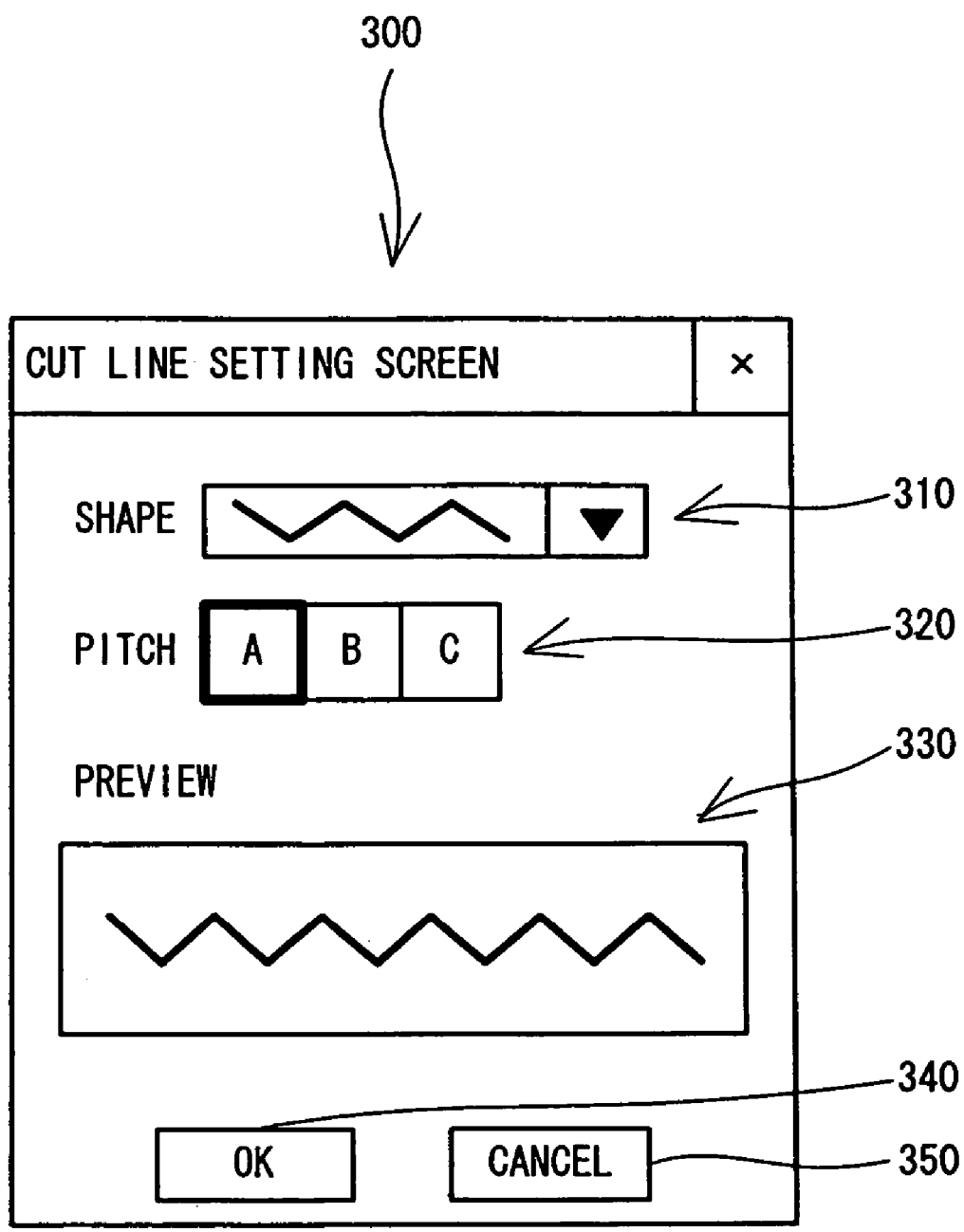
FIG. 6 is a diagram of a range of a cut line setting screen for specifying the shape of a boundary of a cutoff area.
Figure 7:
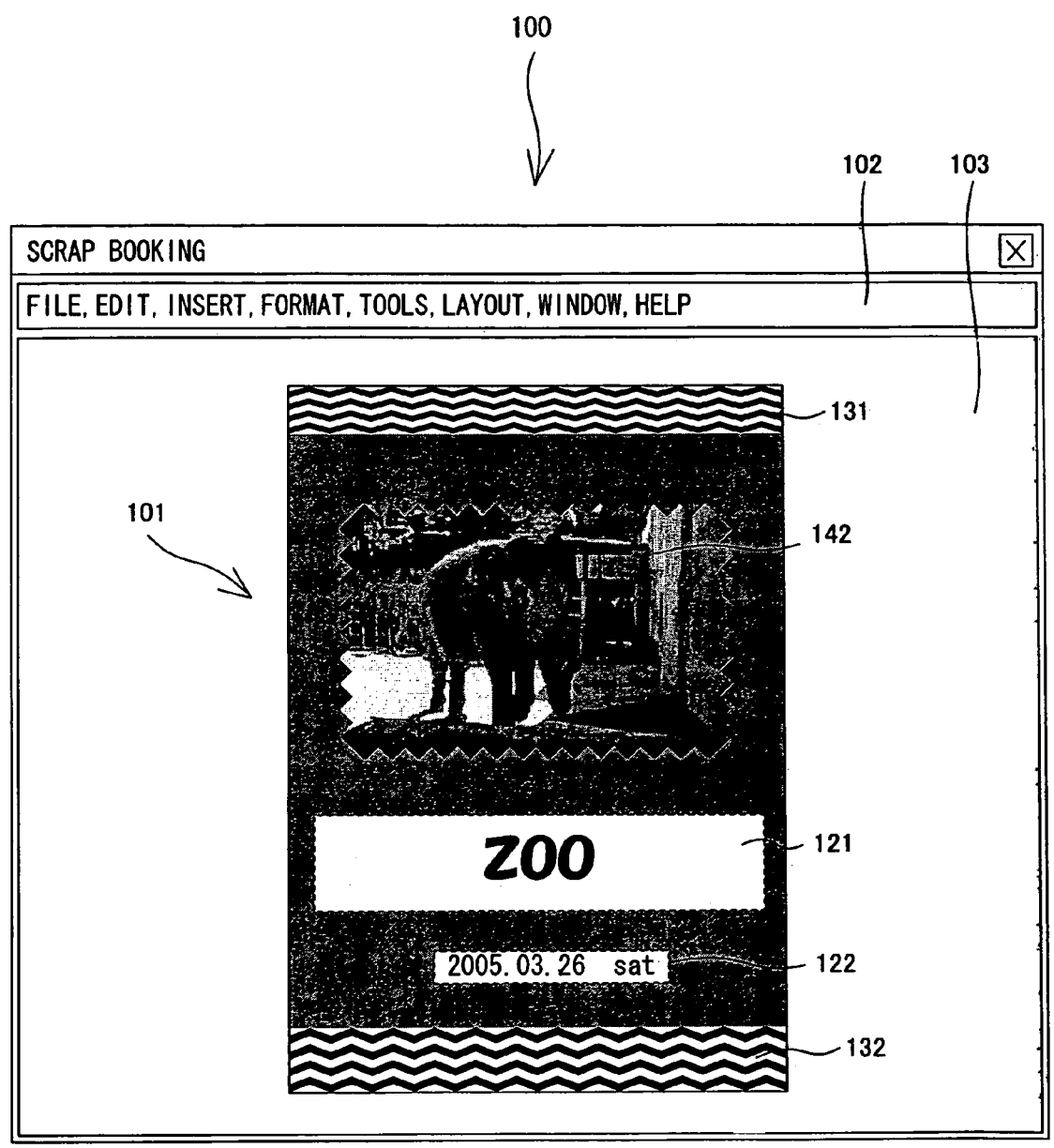
FIG. 7 is a diagram of an edit screen after a cutoff is specified.

Next, a screen displayed when a cutoff is specified to a print object will be described with reference to FIGS. 5 to 7.

First, a range specifying screen 200 will be described with reference to FIG. 5. As shown in FIG. 5, a shape selection area 210 is provided on the left of the range specifying screen 200, a display area 220 for displaying a graphic image 221 of a print object to be cut off is provided in the center and an OK button 224 and a cancel button 225 are provided on the bottom of the display area 220. Graphic forms indicating the shapes of areas to be cut off are listed in the shape selection area 210 and one graphic form may be selected by operating the mouse 33 or the keyboard 35. In the example shown in FIG. 5, a rectangle, parallelogram, diamond, and octagon produced by cutting a rectangle, hexagon, and star form are indicated and a rectangle is selected.

When a graphic form indicating the shape of an area to be cut off is selected in the shape selection area 210, a graphic form 222 of that shape is displayed on the graphic image 221 of a print object in the display area 220. Then, a handle 223 for changing the size is displayed on the top right of the graphic form 222. The size of the graphic form 222 may be changed by bringing a mouse pointer of the mouse 33 onto this handle 223 and dragging it. Further, the position of the graphic form 222 may be changed by bring the mouse pointer onto a line of the graphic form 222 and dragging it.

The size and position may be specified by selecting a graphic form indicating the shape of a cutoff area from the shape selection area 210 and operating the mouse 33. The specification ends when the OK button 224 is selected. Then, a cut line setting screen 300 (see FIG. 6) is displayed. The specification is canceled when the cancel button 225 is selected. A content inputted in the range specifying screen 200 is stored in the range specifying data memory area 1123 such that coordinates of each vertex of graphic form indicating the shape of a cutoff area are stored in an order that the coordinates of adjoining vertexes are consecutive.

The cut line setting screen 300 will be described with reference to FIG. 6. As shown in FIG. 6, a shape section 310, a pitch section 320, a preview section 330, an OK button 340 and a cancel button 350 are provided. The shape section 310 is of pull-down type, which allows the shape of a cutoff line to be specified. Straight line, mountain-like shape and wave-like shape stored in the cut line image memory area 120 of the ROM 12 are displayed here. In the example shown in FIG. 6, a mountain-like shape is displayed. Then, three buttons A, B, and C are displayed on the pitch section 320 and enable a pitch to be specified for a shape selected in the shape section 310. For example, if three mountain-like shape cutoff line images are stored in the cutoff line image memory area 120, the three buttons are displayed. In the meantime, according to this embodiment, the pitch is indicated in the ascending order from A.

A cut line selected in the shape section 310 and pitch section 320 is displayed in the preview section 330. As a result, a user can select a desired cut line. When the OK button 340 is selected, the specification is completed. Then, a cut print object (cut object) is displayed in the work area 103 of the edit screen 100. When the cancel button 350 is selected, the specification is cancelled. A content inputted into the cut line setting screen 300 is stored in the cut line data memory area 1124 such that cut line image stored in the cut line image memory area 120 corresponding to a selected shape and pitch is copied.

Next, the edit screen 100 after the cutoff is set up will be described with reference to FIG. 7. As shown in FIG. 7, a cutting object 142, which is cut along a cutoff area, is displayed in the work area 103. An example shown in FIG. 7 is a cutting object 142 when "rectangle" is specified as the shape of a cutoff area in FIG. 5, and a pitch "A" of the "mountain-like shape" is specified as a cut line and obtained by cutting the photographic object 141 along the mountain-like cutoff line in FIG. 6.

Figure 8:
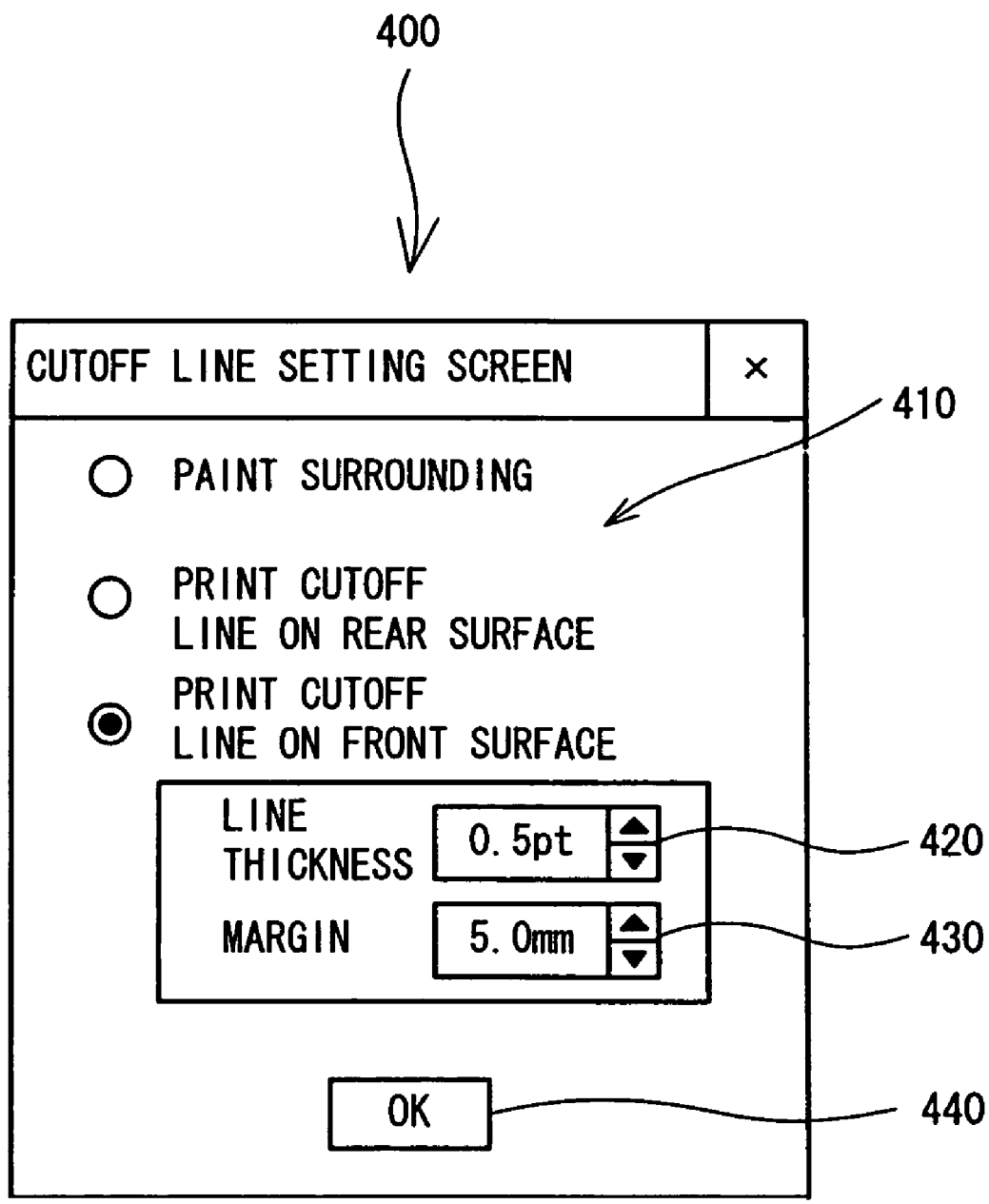
FIG. 8 is a diagram of a cutoff line setting screen for setting a cutoff line.
Figure 9:
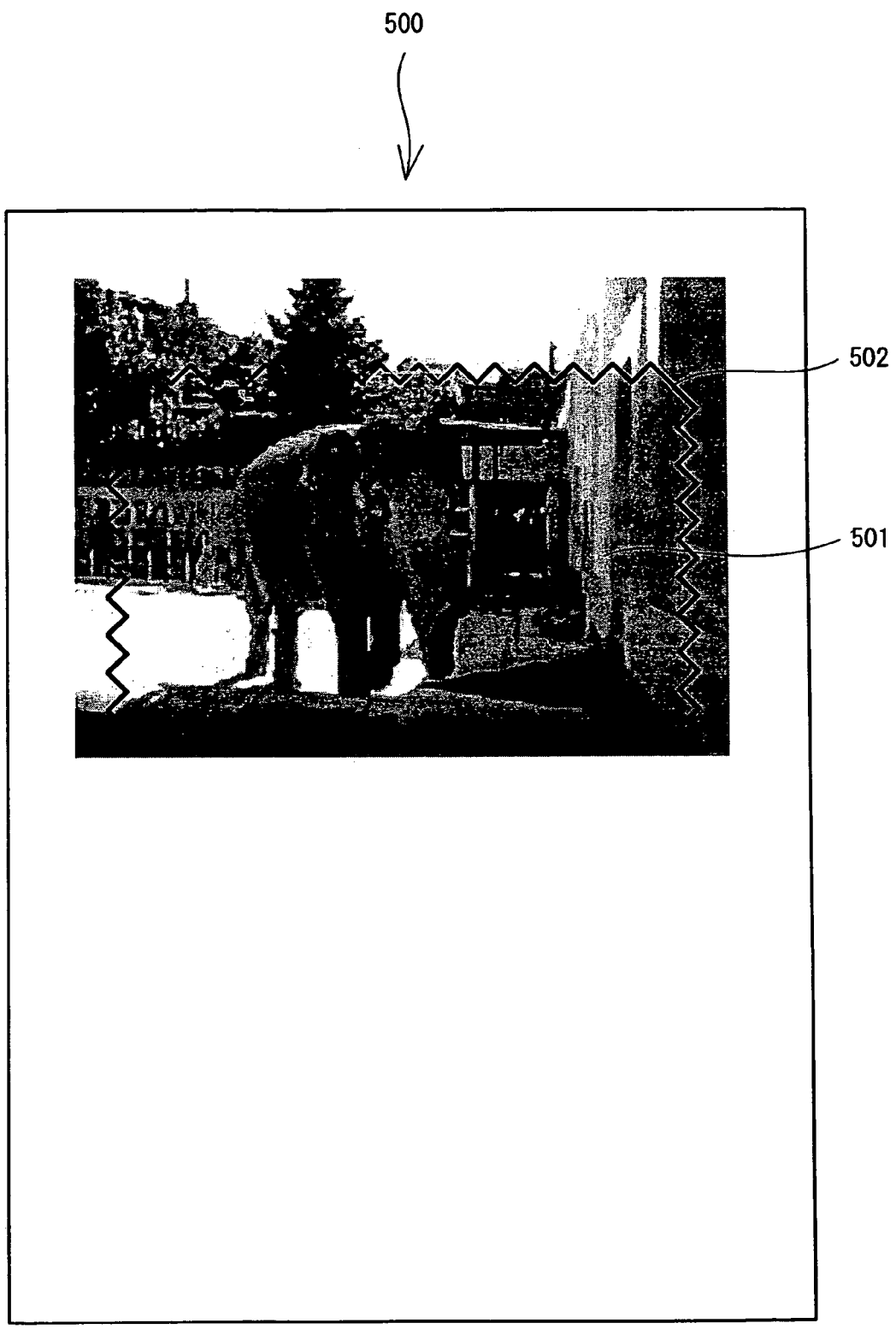
FIG. 9 is an image of a print result having a cutoff line printed as a result of selecting "print a cutoff line on the surface"
Figure 10:
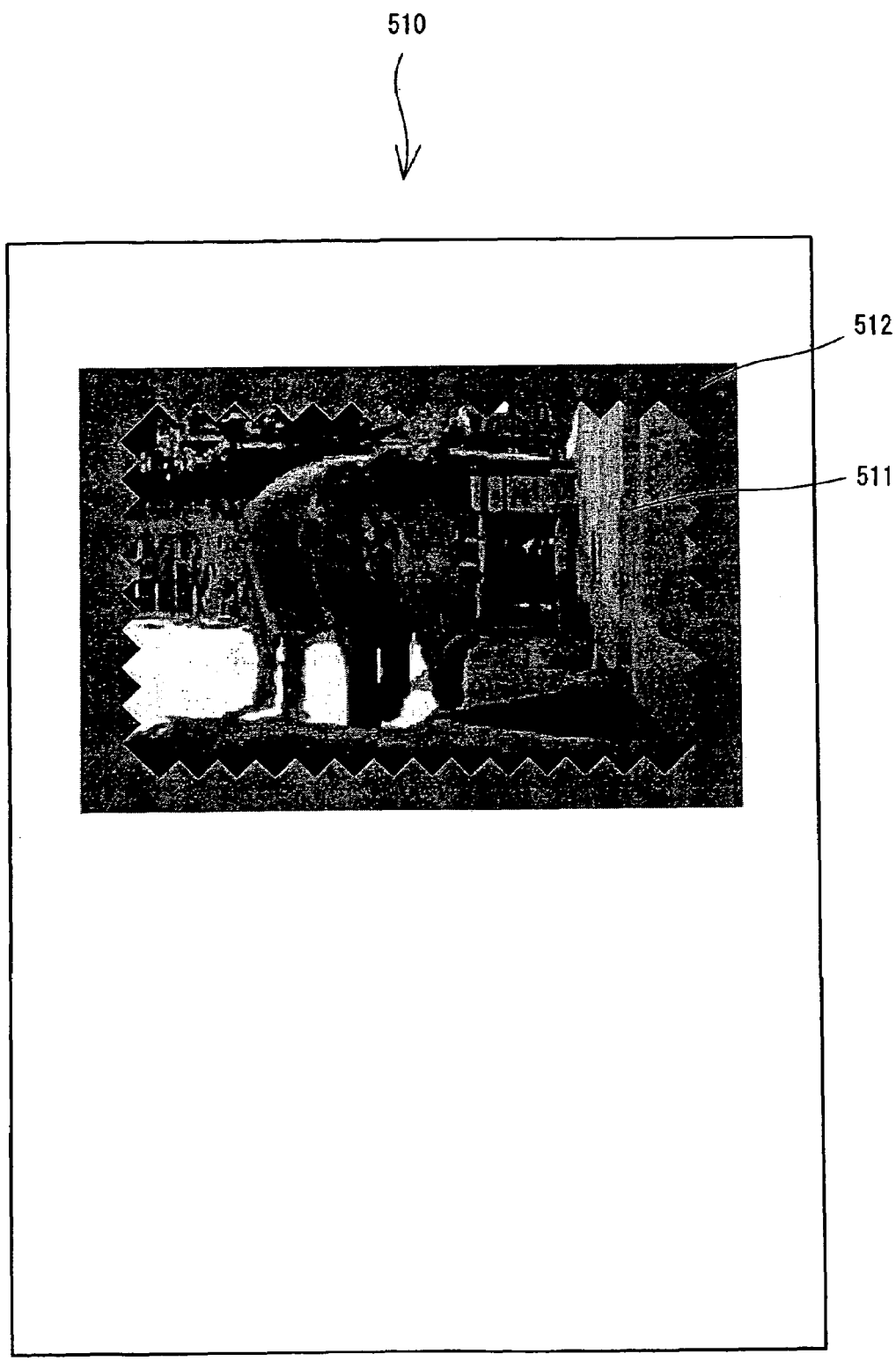
FIG. 10 is an image of a print result in which a surrounding of a cutoff area is painted with background color as a result of selecting "paint a surrounding"
Figure 11:
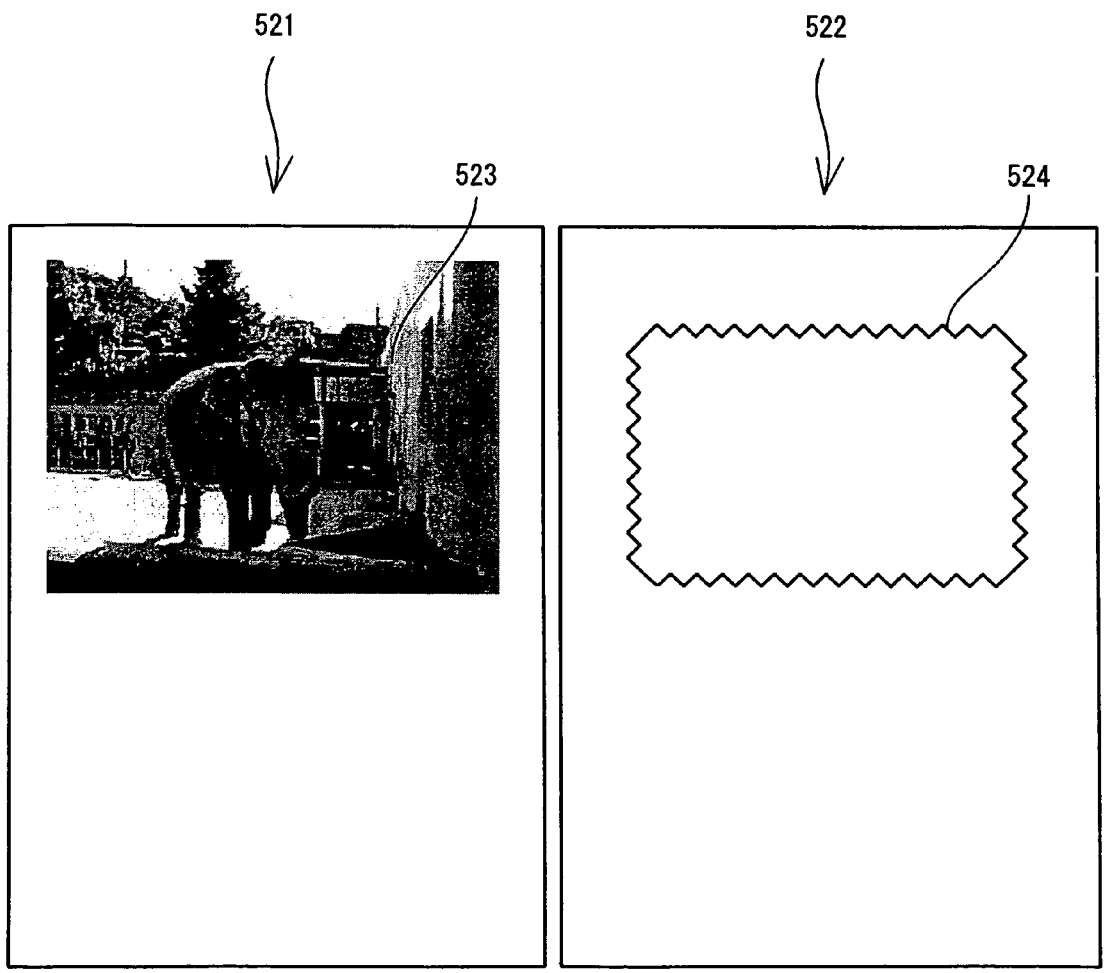
FIG. 11 is an image of print results for front surface and rear surface in which a cutoff line is printed on the rear surface as a result of selecting "print a cutoff line on rear surface"
Figure 12:
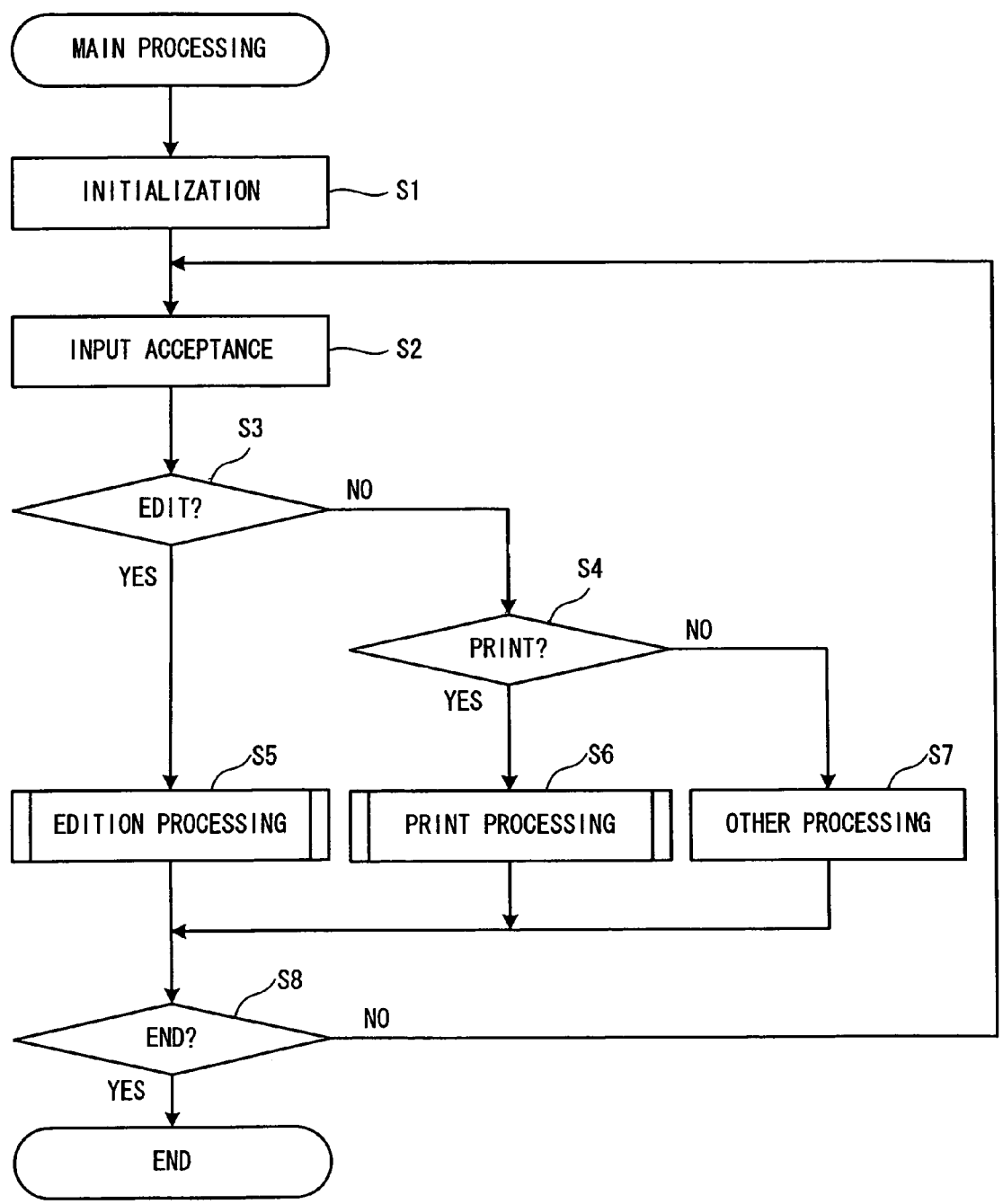
FIG. 12 is a flow chart indicating steps for main processing.

Print results 500, 510, 521, and 522 printed based on the type of cutoff area and cut line specified in FIGS. 5, 6 and a cutoff line setting screen 400 will be described with reference to FIGS. 8 to 11. FIGS. 9 to 11 are image diagrams showing a print result when a print instruction is given to the cutting object 142 (see FIG. 7) when "rectangle" is specified as the shape of a cutoff area in the range specifying screen 200 and a "mountain-like shape" cut line of a pitch "A" is specified on the cut line setting screen 300.

First, the cutoff line setting screen 400 will be described with reference to FIG. 8. As shown in FIG. 8, the cutoff line setting screen 400 includes a cutoff line specifying radio button 410 which specifies whether the surrounding is painted and whether the cutoff line is printed on the front surface or the rear surface, a thickness specifying list box 420 which specifies the thickness of a cutoff line when the cutoff line is printed on the front surface, an amount of a margin specifying list box 430 which specifies a distance from a border of a cutoff area when the cutoff line is printed on the front surface, and an OK button 440.

The cutoff line specifying radio button 410 can select "paint the surrounding", "print the cutoff line on the rear surface" or "print the cutoff line on the front surface". If the "paint the surrounding" is selected, the surrounding of the cutoff object is painted with background color (see FIG. 10). If the "print the cutoff line on the rear surface" is selected, the cutoff line is printed on the rear surface (see FIG. 11). If the "print the cutoff line on the front surface" is selected, the cutoff line is printed on an original photographic object (see FIG. 9). If this "print the cutoff line on the front surface" is selected, the thickness and print position of the cutoff line need to be specified with the thickness specifying list box 420 and the margin specifying list box 430 and the cutoff line specified by the thickness specifying list box 420 and the margin specifying list box 430 is printed on the original photographic object (see FIG. 9). The thickness specifying list box 420 can specify the thickness of a cutoff line to be printed by the unit of 0.1 point. The margin specifying list box 430 can specify a margin amount which is a distance from the border (cut line) of the cutoff area by the unit of 0.1 mm. In the meantime, if it is set to 0 mm, the cutoff line is printed on the cut line.

When the OK button 440 is selected, the specification is completed and a content specified by the cutoff line specifying radio button 410, the thickness specifying list box 420, and the margin specifying list box 430 is stored in the cutoff line data memory area 1125 and printing is carried out according to the content.

Next, the print result 500 when the "print the cutoff line on the front surface" is selected and the cutoff line is printed will be described with reference to FIG. 9. As shown in FIG. 9, a cutoff line 502 having the same shape as the cut line is printed on a print image 501 of the original photographic object with a line of a thickness specified on the cutoff line setting screen 400 with an interval of a predetermined amount (distance specified on the cutoff line setting screen 400) from the cut line.

Next, the print result 510 when the surrounding of a cutoff area is painted with a background color will be described with reference to FIG. 10. As shown in FIG. 10, a predetermined range 512 around a print image 511 of a cut object is painted with the same color as the background.

Next, the print results 521 and 522 in which the cutoff line is printed on the rear surface will be described with reference to FIG. 11. An image diagram on the left side of FIG. 11 is the print result 521 for front surface and an image diagram on the right side is the print result 522 for rear surface (rear surface as a result of inverting the front surface in the right and left direction). As shown in FIG. 11, a print image 523 which is an original photographic object is printed on the front surface and a cutoff line 524 is printed on a contour line (cut line) of the cut object on the rear surface.

The operations of the print data editing apparatus and print data editing program of the present invention will be described with reference to the flow charts of FIGS. 12 to 15.

The main processing is started when the print data editing program is executed. First, initialization of various data is carried out (S1) and next, an input from the mouse 33 or keyboard 35 is received (S2). If the input is an instruction for editing (input of characters, size change or move of print object, insertion of object and the like) (S3: YES), edit processing is carried out (S5, see FIG. 13). If the input is an instruction for printing (S3: NO, S4: YES), print processing is carried out (S6, see FIG. 15). Unless the input is an instruction for editing or an instruction for printing (S3: NO, S4: NO), other processing is carried out (S7). Then, whether an instruction for ending is executed through the mouse 33 or the keyboard 35 is determined (S8) and if the instruction for ending is inputted through the mouse 33 or the keyboard 35 (S8: YES), this processing is terminated. Unless the instruction for ending is executed (S8: NO), the procedure returns to S2, in which a received input (S2) is determined (S3 and S4) and the processings (S5, S6, and S7) following the instructions are executed. Then, the processings S2 to S8 are repeated until an instruction for ending is executed (S8: YES) so that a processing for an instruction from the mouse 33 or the keyboard 35 is carried out.

Input of an instruction for ending is carried out by selecting "file" from the tool bar 102 of the edit screen 100 and selecting "end" from the displayed list box. Input of an instruction for editing is carried out by, for example, selecting "insertion" from the tool bar 102 of the edit screen 100 and selecting the kind of a print object ("photograph", "character", or "illustration") from the displayed list box so as to insert a new print object or selecting an already displayed print object, selecting "edit" on the tool bar 102 and selecting a content of the editing ("rotation", "character input", "attribute change", "cut off", etc.) from the displayed list box. Input for print is carried out by, for example selecting "file" on the tool bar 102 of the edit screen 100 and then selecting "print" in the displayed list box.

"Cutoff instruction" which is an important point of the present invention is carried out by, for example, with a print object to be cut off selected, selecting "edit" from the tool bar 102 and selecting "cutoff" from the displayed list box.

Figure 13:
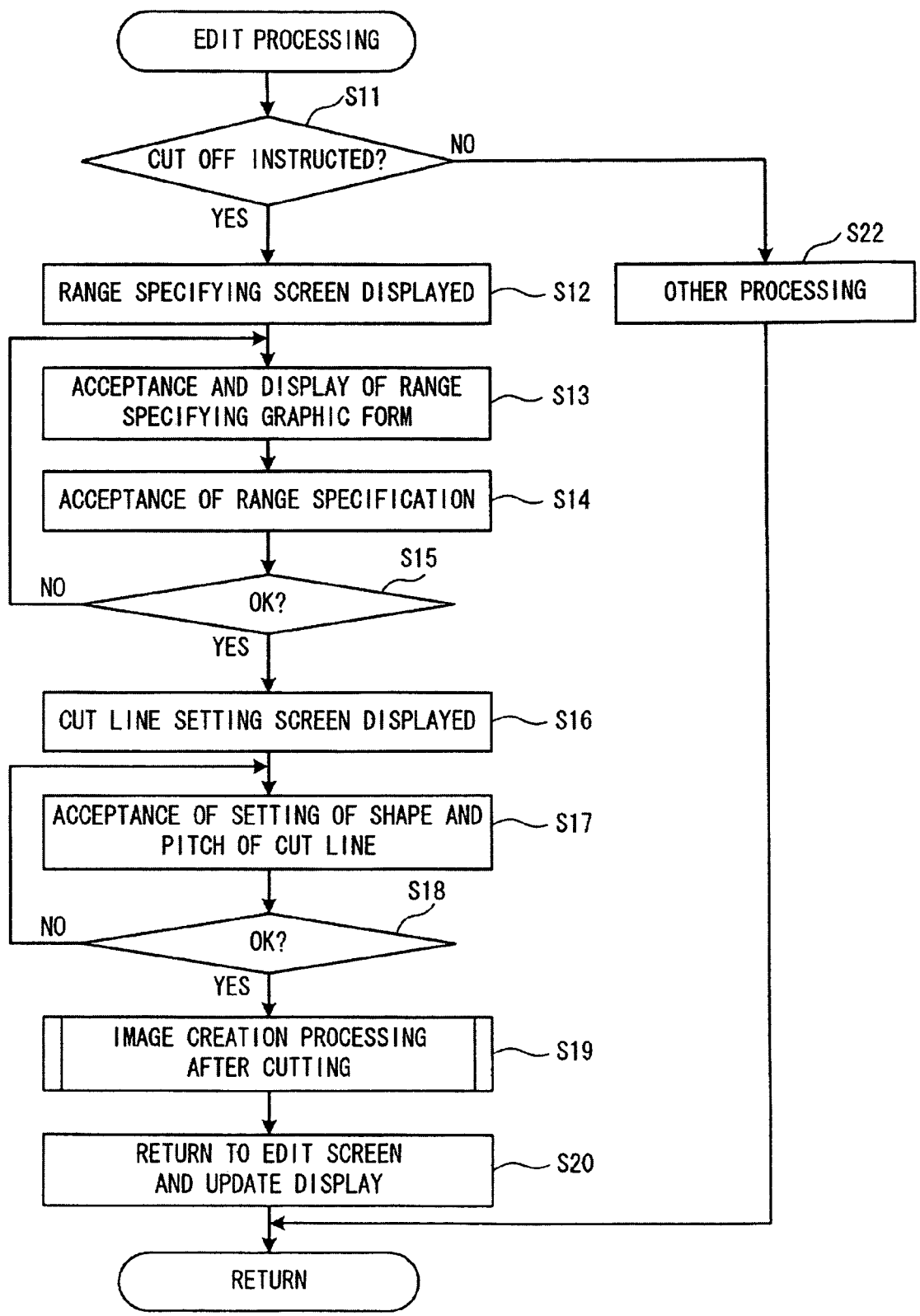
FIG. 13 is a flow chart of edit processing to be executed in the main processing.

A major point of the present invention in edit processing will be described with reference to the flow chart of FIG. 13. First, whether the input is "cutoff instruction" is determined (S11). Unless the "cutoff instruction" is executed (S11: NO), other processing is carried out (S22) and the procedure returns to the main processing. If the "cutoff instruction" is carried out (S11: YES), the range specifying screen 200 (see FIG. 5) is displayed (S12). Selection of a graphic form for specifying a range is carried out in the shape selection area 210 and if any graphic form is selected, that graphic form 222 is displayed on the display area 220 (S13). Then, specification of a range for the graphic form 222 displayed in the display area 220 (handling 223 of the graphic form 222 with the mouse 33 and operation of line) is accepted (S14) and whether the OK button 224 is selected is determined (S15). Unless the OK button is selected (S15: NO), the procedure returns to S13, in which acceptance of a selection of a graphic form for specifying a range (S13) and acceptance of a specification of the range (S14) are repeated.

Then, if the OK button 224 is selected (S15: YES), the range specifying screen 200 is closed because the specification of the range is completed and the cut line setting screen 300 is displayed (S16). Then, a setting input of the shape and pitch of the cut line is accepted (S17) and whether the OK button 340 is selected is determined (S18). Unless the OK button is selected (S18: NO), the procedure returns to S17, in which acceptance of the setting input of the shape and pitch of the cut line is repeated (S17). Then, if the OK button 340 is selected (S18: YES), the cut line setting screen 300 is closed and image creation processing after cutting is carried out (S19, see FIG. 14).

Figure 14:
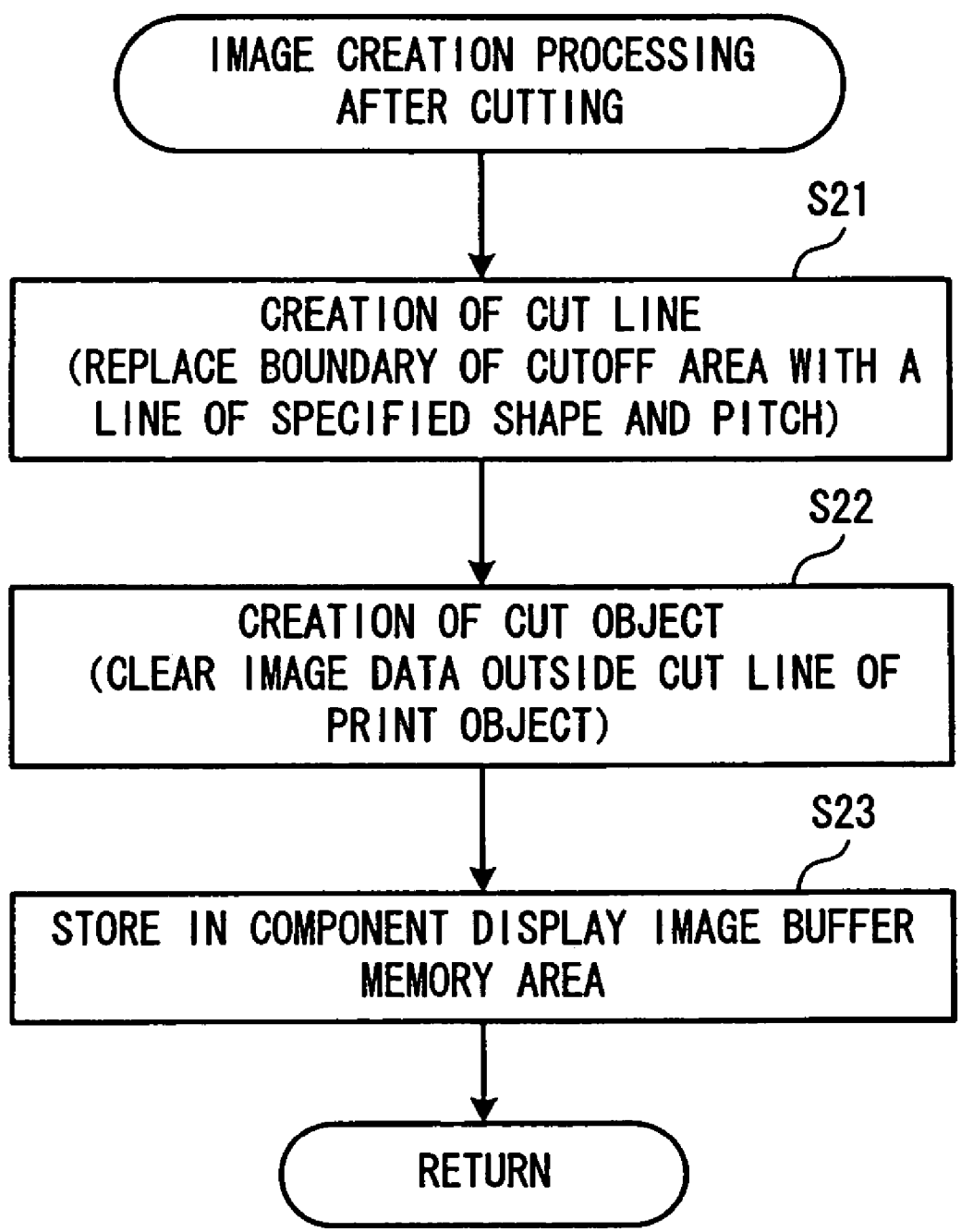
FIG. 14 is a flow chart of image creation processing after cutoff, which is executed in edit processing.

In the image creation processing after cutting, as shown in FIG. 14, first, each line segment of the boundary of a cutoff area specified by the range specifying screen 200 is replaced with a line having the shape and pitch specified by the cut line setting screen 300 so as to create a cut line (S21). Then, image data outside the cutoff line in image data of a print object specified for the cutoff is erased so as to create a cut object (S22). Data of the cut line created in S21 is stored in the cut line data memory area 1124 of the component display buffer memory area 112, and data of a cut object created in S22 is stored in the cut object image memory area 1122 of the component display buffer memory area 112 (S23). Then, the procedure returns to edit processing.

In the edit processing, the photographic object 141 displayed in the work area 103 of the edit screen 100 is updated to the cutting object 142 (S20) (see FIG. 7) and the procedure returns to the main processing.

Figure 15:
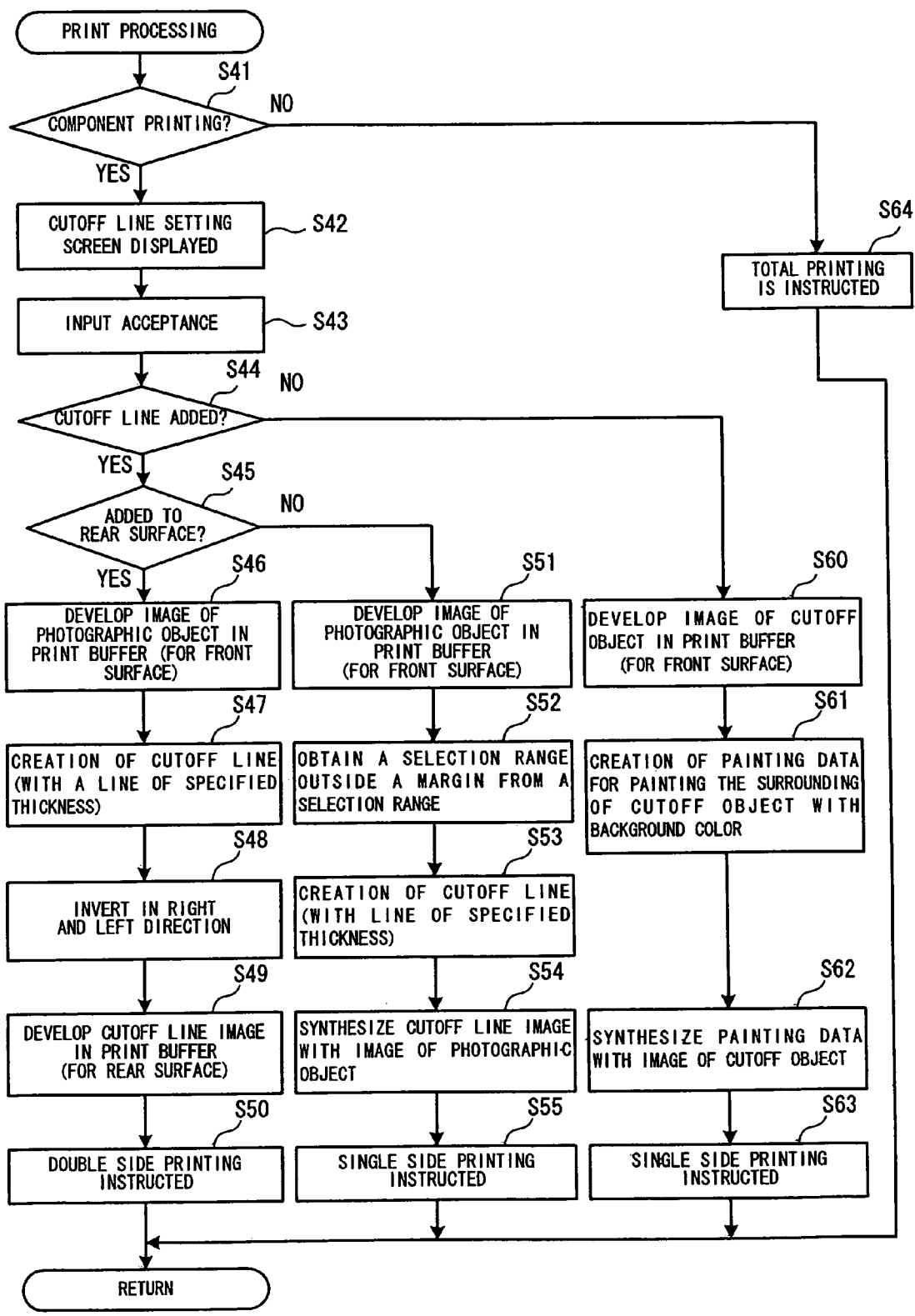
FIG. 15 is a flow chart of print processing to be executed in the main processing.

Print processing will be described with reference to the flow chart of FIG. 15. First, when printing is instructed, a print object is selected and whether "component printing" for printing only that print object is specified is determined (S41). Unless the "component printing" is specified (S41: NO), total printing is instructed because the "total print" for printing an entire image displayed in the work area 103 is instructed (S64) and the procedure returns to the main processing.

If the "component printing" is instructed (S41: YES), the cutoff line setting screen 400 is displayed (S42). Printing is carried out according to the input content. Input to the cutoff line setting screen 400 is accepted after the cutoff line setting screen 400 is displayed (S42) and if the OK button 440 is selected (S43), whether selection for adding the cutoff line is achieved is determined (S44). If "print the cutoff line on the rear surface" or "print the cutoff line on the front surface" is selected with the cutoff line specifying radio button 410, the selection for adding the cutoff line is achieved (S44: YES) and therefore, whether it is added to the rear surface is determined (S45).

If "print the cutoff line on the rear surface" is selected with the cutoff line specifying radio button 410, the cutoff line is added to the rear surface (S45: YES). First, an image of a picture stored in the object information memory area 1121 is developed in the front surface buffer memory area 1131 (S46). Then, image data of the cutoff line is created (S47). More specifically, the coordinate of a vertex of a graphic form indicating a cutoff area stored in the range specifying data memory area 1123 is read out and respective vertexes are connected with a portion of the image data of the cutoff line stored in the cutoff line data memory area 1124 which is cut into a length substantially the same as an interval between the vertexes. A line enclosed in this way is an image of the cutoff line. Because this cutoff line is printed on the rear surface, it is inverted depending on a paper feeding direction at the time of printing (because the paper is fed in the right and left direction according to this embodiment, it is inverted in terms of the right and left direction) (S48) and developed in the rear surface print buffer area 1132 (S49). Then, print data to which double side printing is instructed is sent to the printer 2 (S50) and the procedure returns to the main processing.

Unless "print the cutoff line on the rear surface" is selected with the cutoff line specifying radio button 410, "print the cutoff line on the front surface" is selected and a cutoff line is added to the front surface (S45: NO). Thus, first, an image of a picture stored in the object information memory area 1121 is developed in the front surface print buffer memory area 1131 (S51). Then, the coordinates of respective vertexes indicating a graphic form outside by a margin set by the cutoff line setting screen 400 is obtained from the coordinates of the graphic form expressing a cutoff range indicated with a contour line and the amount of the margin. More specifically, a parallel line is drawn apart from each side of a graphic form indicating a cutoff range by an amount of the margin outside that graphic form. Then, intersections of those lines are obtained. Of the intersections, only vertexes of a graphic form analogous to an original graphic form are obtained (S52). The respective vertexes are connected with a portion of image data of the cutoff line stored in the cut line data memory area 1124 which is cut into a length substantially equal to the interval between the vertexes. Image data of the cutoff line is created by adjusting such an enclosed line to a thickness stored in the cutoff line data memory area 1125 (S53).

Image data of a created cutoff line and image of a cut object developed in S51 are synthesized (S54). Then, print data to which single side printing on only the front surface is instructed is sent to the printer 2 (S55) and the procedure returns to the main processing.

If "paint the surrounding" is selected, it is determined that no cutoff line is added in S44 (S44: NO) and an image of a cut object stored in the cut object image memory area 1122 is developed in the front surface print buffer memory area 1131 (S60). Then, painting data for painting an area outside the contour of the cut object and inside a predetermined rectangle with background color is created (S61). Assuming that the minimum value of X coordinate of a cut object is x, the maximum value is X, the minimum value of Y coordinate is y, the maximum value is Y and a distance of about 1 cm in a print result is a, the predetermined rectangle is one enclosed by four points, A(x−a, Y+a), B(X+a, Y+a), C(X+a, y−a), D(x−a, y−a). If each value is off a range which can be printed, it is replaced with a coordinate just within the range which can be printed.

Created painting data is developed in the front surface print buffer memory area 1131 and synthesized with an image of the cut object developed in S60 (S62). Print data to which single side printing on only the front surface is instructed is sent to the printer 2 (S63) and the procedure returns to the main processing.

When it is intended to use a print result by cutting off, the shape of a cutoff area and the shape of its contour (cut line) can be specified. Then, if "print the cutoff line on the front surface" is selected, the cutoff line can be printed on the same surface as the print result by setting the thickness of the cutoff line and the amount of the margin from the cutoff area corresponding to a desire of a cutting person. If "print the cutoff line on the rear surface" is selected, the cutoff line can be printed on the rear surface in which the print result is printed. In this case, the print result is not affected by any cutoff line left after cutting. If "paint the surrounding" is selected, the surrounding of a print result can be painted with a background color because a means for painting an area outside the boundary of the cutoff area with the background color of the print object (color of the surrounding) is provided (S61 and S62 of print processing). In this case, even if the painting color is left after cutting, the color that is left is not apparent because it is same as the background color when a print result is pasted thereon after cutting.

Meanwhile, the print data editing apparatus and print data editing program of the present invention are not restricted to the above-described embodiments but needless to say, may be modified in various ways within a range not departing from the gist of the present invention.

Although according to the above embodiments, the pitch is specified with the buttons A, B, and C in the pitch section 320 of the cut line setting screen 300, the pitch of data stored in the cut line image memory area 120 may be expressed with a unit expressing a distance such as mm or it is permissible to express the pitch with "narrow", "wide" and the like. Because the pinking scissors are marked with a pitch when sold, which pitch should be used is easily understood if it is expressed with a distance. Further, the cut line may be generated corresponding to an inputted pitch by inputting a length which is desired to be specified. Although according to the above embodiments, the shape of a cutoff area is selected from graphic forms enclosed with straight lines, it may be selected from curved lines such as a circle and an ellipse.

Although according to the above embodiment, only the thickness of a line and amount of margin are set on the cutoff line setting screen 400, it is permissible to set a line type (for example, solid line, dotted line, a dot and dash line and the like) and color. In this case, a cutoff line is generated depending on a set line type in the print processing of S47 and S53 shown in FIG. 15.

As described above, in the print data editing apparatus of the present invention, the display displays a print object in order to edit a print object such as photograph, character, picture, or pattern, the cutoff area specifying devices specifies a cutoff area which is an area to be cut off in order to cut off a print result in which the print object displayed on the display is printed and the print data creating device creates print data to be printed with a print unit by providing cutoff line data to the print object, wherein the cut off line data is for printing a cutoff line for cutting a cutoff area specified by the cutoff area specifying device from the print result outside a boundary of the cutoff area. Consequently, an area to be cut off is specified and a cutoff line is printed along that area in a print object based on the print data and therefore, it is convenient for cutting the print object for individual purposes.

In the print data editing apparatus of the present invention, the distance specifying device specifies a distance, of the cutoff line indicated by the cutoff line data provided by the print data creating device, from the boundary. Therefore, a cutoff line whose distance from a boundary that suits a user's desire can be provided.

In the print data editing apparatus of the present invention, the thickness specifying device specifies a thickness of the cutoff line. Therefore, a cutoff line of a thickness that matches a user's desire can be provided.

In the print data editing apparatus of the present invention, the line type specifying device of the cutoff area specifying device specifies a shape of a boundary of the cutoff area by specifying a shape of a line. The shape of the line may include at least a line imitating the shape of a cut edge of scissors for use in cutting a print result. Because a cutoff line meeting the shape of a cut edge of scissors to be used can be provided, particularly, this is effective in case where a pair of scissors whose cut edge is not straight, like pinking scissors, is used.

In the print data editing apparatus of the present invention, the front surface/rear surface selecting device selects whether the cutoff line is to be printed on a front surface which is a same surface as a face on which the print data is to be printed or on a rear surface. The print data creating device can, if printing on the rear surface is selected by the front surface/rear surface selecting device, dispose the cutoff line on the boundary and create print data of rear surface cutoff line data to be printed on the rear surface. Therefore, the cutoff line can be printed on the rear surface based on that print data, thereby not affecting the print result.

In a storage medium storing a set of program instructions executable on a data processing device and usable to edit print data for printing an object such as photograph, character, picture, or pattern to be printed, and cutting off a print result after printing with a print unit, the program instructions include instructions in which the print object is displayed, a cutoff area which is an area to be cut off is specified and print data to be printed with a print unit by providing cutoff line data to the print object is created, wherein the cutoff line data is for printing a cutoff line for cutting the cutoff area specified from the print result outside a boundary of the cutoff area. Therefore, because an area to be cut off for use is specified in the print object based on the print data and the cutoff line is printed along that area, it is convenient for cutting the print object for individual purposes.

In the storage medium of the present invention, the instructions for specifying a distance can specify a distance, of the cutoff line indicated by the cutoff line data provided, from the boundary. Therefore, a cutoff line whose distance from the boundary matches a user's desire can be provided.

In the storage medium of the present invention, the instructions for specifying the thickness can specify a thickness of the cutoff line. Therefore, a cutoff line of a size matching a user's desire can be provided.

In the storage medium of the present invention, the instructions for specifying the line type of the cutoff area can specify the shape of a boundary of the cutoff area by specifying the type of line. The shape of the line may include at least a line imitating the shape of a cut edge of scissors for use in cutting the print result. Because a cutoff line meeting the shape of a cut edge of scissors to be used can be provided, particularly, this is effective in case where a pair of scissors whose cut edge is not straight, like pinking scissors, is used.

In the storage medium of the present invention, the instructions for selecting the front surface/rear surface can select whether the cutoff line is to be printed on a front surface which is a same surface as a face on which the print data is to be printed or on a rear surface. The print data creating step, if printing on the rear surface is selected, can dispose the cutoff line on the boundary and create the print data of the rear surface cutoff line data to be printed on the rear surface. Therefore, the cutoff line can be printed on the rear surface based on that print data, thereby not affecting the print result.

While the disclosure has been made with reference to exemplary embodiments, it is to be understood that the invention is not limited to the exemplary embodiments or structures. While the various elements of the exemplary embodiments are shown in various combinations and configurations, which are exemplary, other combinations and configurations, including more, less or only a single element, are also within the spirit and scope of the invention.

What is claimed is:

1. A print data editing apparatus, comprising:
   a display that displays a print object in order to edit the print object;
   a cutoff area specifying device that specifies a cutoff area that is an area to be cut off in order to cut off a print result in which the print object that is displayed on the display is printed;
   a print data creating device that creates print data to be printed with a print unit by providing cutoff line data to the print object, wherein the cutoff line data is for printing a cutoff line for cutting the cutoff area specified by the cutoff area specifying device from the print result outside a boundary of the cutoff area and within a boundary of the print object; and
   a front surface/rear surface selecting device that selects whether the cutoff line is to be printed on a front surface that is a same surface as a face on which the print data is to be printed or on a rear surface, wherein the print data creating device disposes the cutoff line on the boundary of the cutoff area and creates print data of rear surface cutoff line data to be printed on the rear surface if printing on the rear surface is selected by the front surface/rear surface selecting device.

2. The print data editing apparatus according to claim 1, further comprising a distance specifying device that specifies a distance, of the cutoff line indicated by the cutoff line data provided by the print data creating device, from the boundary of the cutoff area.

3. The print data editing apparatus according to claim 1, further comprising a thickness specifying device that specifies a thickness of the cutoff line.

4. The print data editing apparatus according to claim 1, wherein:
   the cutoff area specifying device includes a line type specifying device that specifies a shape of the boundary of the cutoff area by specifying a shape of a line, and
   the shape of the line includes at least a line imitating a shape of a cut edge of scissors for use in cutting the print result.

5. A computer readable storage medium storing a set of program instructions executable on a data processing device and usable to edit print data for printing an object by cutting off a print result after printing with a print unit, the instructions comprising:
   displaying the print object in order to edit the print object;
   specifying a cutoff area that is an area to be cut off in order to cut off a print result in which the print object that is displayed is printed;
   creating print data to be printed with a print unit by providing cutoff line data to the print object, wherein the cutoff line data is for printing a cutoff line for cutting the cutoff area specified from the print result outside a boundary of the cutoff area and within a boundary of the print object; and
   selecting whether the cutoff line is to be printed on a front surface which is a same surface as a face on which the print data is to be printed or on a rear surface, wherein if printing on the rear surface is selected, disposing the cutoff line on the boundary of the cutoff area and creating print data of the rear surface cutoff line data to be printed on the rear surface.

6. The computer readable storage medium according to claim 5, the instructions further comprising:
specifying a distance, of the cutoff line indicated by the cutoff line data provided, from the boundary of the cutoff area.

7. The computer readable storage medium according to claim 5, the instructions further comprising:
specifying a thickness of the cutoff line.

8. The computer readable storage medium according to claim 5, wherein specifying the cutoff area includes specifying a shape of the boundary of the cutoff area by specifying a shape of a line, and the shape of the line includes at least a line imitating a shape of a cut edge of scissors for use in cutting the print result.

9. A print data editing apparatus, comprising:
a display that displays a print object in order to edit the print object;
a print unit; and
a controller that:
specifies a cutoff area that is an area to be cut off in order to cut off a print result in which the print object that is displayed on the display is printed;
creates print data to be printed with the print unit by providing cutoff line data to the print object, wherein the cutoff line data is for printing a cutoff line for cutting the cutoff area specified from the print result outside a boundary of the cutoff area and within a boundary of the print object; and
selects whether the cutoff line is to be printed on a front surface that is a same surface as a face on which the print data is to be printed or on a rear surface, wherein the cutoff line is disposed on the boundary of the cutoff area and print data of rear surface cutoff line data is created in order to be printed on the rear surface if printing on the rear surface is selected.

10. The print data editing apparatus according to claim 9, wherein the controller specifies a distance, of the cutoff line indicated by the cutoff line data, from the boundary of the cutoff area.

11. The print data editing apparatus according to claim 9, wherein the controller specifies a thickness of the cutoff line.

12. The print data editing apparatus according to claim 9, wherein the controller:
specifies a shape of the boundary of the cutoff area by specifying a shape of a line, wherein the shape of the line includes at least a line imitating a shape of a cut edge of scissors for use in cutting the print result.

* * * * *